April 2, 1968 C. T. LLOYD 3,375,671
FACILITY FOR MAINTAINING LIFE UNDER SEA
Filed Feb. 11, 1965
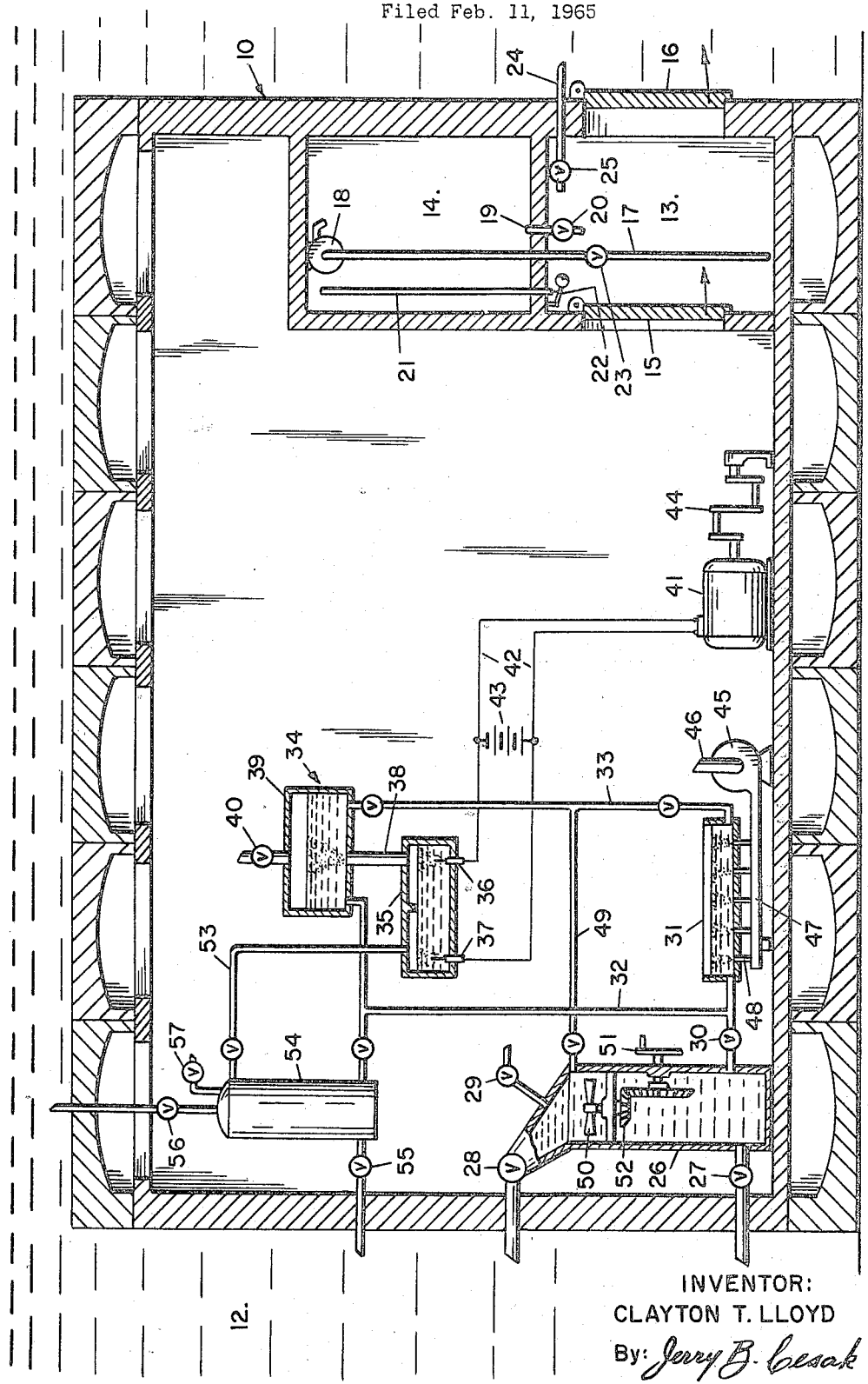
INVENTOR:
CLAYTON T. LLOYD
By: Jerry B. Cesak

United States Patent Office 3,375,671
Patented Apr. 2, 1968

3,375,671
FACILITY FOR MAINTAINING
LIFE UNDER SEA
Clayton T. Lloyd, 4917 55th Place,
Hyattsville, Md. 20781
Filed Feb. 11, 1965, Ser. No. 431,916
5 Claims. (Cl. 61—69)

ABSTRACT OF THE DISCLOSURE

A submerged, water pressure-resistant building having an entrance-exit through doors in the lower of two superposed watertight chambers provided in the building. Pump means and valve means are provided for transferring water from either chamber to the other and for placing water in the lower chamber at ambient sea pressure. The building also contains sea water desalinating means and electrolytic water decomposing means, together with means for supplying sea water thereto and returning waste products therefrom to the sea.

---

This invention relates to new and useful improvements in under sea living quarters, and the principal object of the invention is to provide a facility whereby human life may be maintained under sea for indefinite periods of time without dependence on sustaining support from the surface.

This object is attained by the provision of a water pressure-resistant building which is completely submerged at a suitable depth in a sea, an important feature of the invention residing in providing the building with a novel entrance-exit through which passage may be had with ease and convenience, notwithstanding outside pressure of the sea.

Another important feature of the invention resides in the provision of water desalinating means, and also means for generating oxygen in the building by electrolytic decomposition of water, current for the electrolysis being provided by a manually powered electric generator. Also, means are provided for supplying sea water to the desalinating means and to the electrolytic decomposing means, and for discharging waste products such as hydrogen, carbon dioxide, et cetera, from the building into the sea.

With the foregoing more important objects and features in view and such other objects and features as may become apparent as this specification proceeds, the invention will be understood from the following description taken in conjunction with the accompanying drawing, wherein the single drawing figure is a view, partly diagrammatic and partly in vertical section, showing the under sea facility of the invention.

Referring now to the accompanying drawing in detail, the under sea facility of the invention comprises a water pressure-resistant building designated generally by the reference numeral 10, the same being completely submerged at a suitable depth in a sea, the water surrounding the building being indicated at 12.

To permit divers to enter and leave the building, an entrance-exit is provided, consisting of two superposed, watertight chambers, namely, a lower chamber 13 and an upper chamber 14. The lower chamber 13 has an inner door 15 communicating with the interior of the building, and an outer door 16 opening into the sea. Water may be pumped from the lower chamber 13 into the upper chamber 14 through a conduit 17 equipped with a suitable pump 18. Also, water may be drained from the upper chamber 14 into the lower chamber 13 through a drain 19 equipped with a shut-off valve 20. A vent tube 21 extends between the two chambers as shown, so that air may be transferred from the lower chamber into the upper chamber to displace water being drained from the upper into the lower chamber and, conversely, so that air may escape from the upper chamber into the lower chamber when water is being pumped into the upper chamber. The lower end of the vent tube 21 is preferably provided with a float-actuated valve 22 to prevent escape of water from the lower into the upper chamber when water in the lower chamber is pressurized as hereinafter explained. For the same purpose a shut-off valve 23 may be provided in the conduit 17 leading to the pump 18. A water pressurizing conduit 24 extends outwardly from the lower chamber 13 to the sea and is equipped with a shut-off valve 25.

In using the entrance-exit to pass from the inside of the building to the sea, a diver enters the lower chamber 13 through the inner door 15 and both doors 15, 16 are closed. At that point the valves 20, 23, 25 are closed, the valve 22 is open and, from previous use the chamber 13 contains air while the upper chamber 14 is filled with water. The diver in the chamber 13 then opens the valve 20, thus allowing water from the chamber 14 to drain into the chamber 13 while air is transferred from the chamber 13 to the chamber 14 through the vent tube 21. As water fills the chamber 13, the float valve 22 becomes closes and when the chamber 13 is completely filled, the diver closes the drain valve 20. The valve 25 is then opened so that water in the chamber 13 is placed under ambient sea pressure outside the building, this permitting the outside door 16 to be easily opened and the diver may then step out into the sea. When re-entering the building, the diver passes through the outside door 16 into the chamber 13 and both doors 15, 16 are closed. The valves 20, 25 are closed and the valve 23 is opened, whereupon the pump 18 is actuated to transfer water from the chamber 13 into the upper chamber 14. As this occurs, the float valve 22 becomes opened and air is transferred from the upper chamber into the lower chamber. The diver then enters the interior of the building through the inner door 15.

Means are provided for admitting sea water into the building for desalination and also for generation of oxygen as hereinafter described, such means being also operative to discharge waste products from the building into the sea. These means comprise a water transfer tank 26 having a valved water inlet 27 and a valved water outlet 28 communicating with the sea. The tank 26 also has a bleeder valve 29 opening into the interior of the building, so that when the tank is filled with sea water at ambient sea pressure and the valves of the inlet 27 and outlet 28 are closed, opening of the bleeder valve 29 will permit a few drops of water to escape so that the ambient sea pressure of water in the tank is reduced to static head pressure.

Water is supplied from the tank 26 through a valved conduit 30 to a water desalinating tray 31 which also serves as an air purifier as hereinafter explained. Additional conduits 32, 33 deliver water to an oxygen generating apparatus 34, which includes an electrolysis unit 35 having a pair of electrodes 36, 37 at which water is decomposed into oxygen and hydrogen, respectively. The unit 35 communicates through a duct 38 with a water chamber 39 and the oxygen which is liberated at the electrode 36 bubbles through the water in the chamber 39, whereupon it is discharged into the interior of the building through a valved outlet 40 to facilitate breathing of personnel in the building. The electrodes 36, 37 are energized by direct current supplied by a suitable generator 41 through a pair of conductors 42, and a storage battery 43 may be provided in the circuit as shown. The generator is manually powered in any suitable manner, for example as diagrammatically shown, by a crankshaft-like foot pedal device 44.

Water in the tray 31 is desalinated by freezing and, as already stated, the tray also serves as an air purifier. For this purpose a blower 45 is provided, having an air intake 46 drawing air from the interior of the building, and also having an outlet duct 47 provided with a plurality of jets 48 whereby air delivered by the blower is bubbled through the cold water in the tray 31. In so doing, exhaled carbon dioxide contained in the air is absorbed in the water as carbonic acid. Water containing the absorbed carbon dioxide as well as brine and chlorine by-products of desalination is discharged as waste from the tray 31 through a valved conduit 49 into the water transfer tank 26, the conduit 49 also serving to discharge any chlorine-containing water from the chamber 39 after the water has been subjected to bubbling of oxygen therethrough subsequent to electrolysis, as already explained.

When waste-containing water is to be discharged from the tank 26 into the sea, the bleeder valve 29 and valves on the conduits 30, 49 are closed, while the valves 27, 28 are opened. The water in the tank 26 is thus placed at ambient sea pressure and may be expelled from the tank through the outlet 28 by a rotary impeller 50. The latter may be manually actuated, as by a handwheel 51 operatively connected to the impeller by gearing 52. The impeller 50 may also be used in the manner of a pump for delivering water from the tank 26 to the tray 31 and to the oxygen generator 34, if static head pressure of the water in the tank is not sufficient to effect such delivery.

Hydrogen liberated at the electrode 37 of the electrolysis unit 35 is delivered through a valved conduit 53 into a hydrogen disposal vessel 54, having a valved water inlet 55, a valved outlet 56 and a bleeder valve 57, arranged in much the same manner as the corresponding components 27, 28, 29 of the tank 26. The vessel 54 may be partially filled with water reduced to static head pressure and after hydrogen has been admitted into the vessel, the water may be brought to ambient sea pressure and the hydrogen blown out through the outlet 56 into the sea.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

I claim:

1. A facility for maintaining life under sea for indefinite periods without dependence on sustaining support from the surface, said facility comprising a water pressure-resistant building completely submerged in a sea, said building having an entrance-exit including lower and upper watertight chambers in superposed relation, an inner door communicating the interior of said building with the lower chamber, an outer door communicating the lower chamber with the sea, means for selectively draining water under static head pressure from the upper chamber into the lower chamber when said inner and outer doors are closed, valve means selectively communicating the lower chamber with the sea whereby to place water drained into the lower chamber at the ambient sea pressure and facilitate opening of the outer door, and means for selectively pumping water from the lower chamber into the upper chamber when said doors are closed whereby to facilitate opening of the inner door, sea water desalinating means and electrolytic water decomposing means provided in said building, means for supplying sea water to said desalinating and decomposing means and for returning waste products therefrom to the sea, said water supplying and waste removing means comprising a water transfer tank provided in said building and having a valved inlet and a valved outlet communicating with the sea, a bleeder valve communicating said tank with the interior of the building whereby water at ambient sea pressure in the tank may assume static head pressure when said valved inlet and outlet are closed and said bleeder valve is opened, valved conduit means connecting said tank to said desalinating and decomposing means, pump means in said conduit means for selectively delivering water under static head pressure in the tank to said desalinating and decomposing means and returning waste products from the latter into the tank, and means for producing a water current thruogh said tank when said valved inlet and outlet are open whereby to discharge waste carrying water into the sea, a manually powered electric generator provided in said building and connected to said water decomposing means whereby to supply the interior of the building with oxygen, means for discharging hydrogen from said water decomposing means into the sea, and means for circulating the gas content of the building through said water desalinating means whereby to remove carbon dioxide from the gas content and discharge the carbon dioxide with said waste products into the sea through said tank.

2. The facility as defined in claim 1 together with means for transferring gas from said lower chamber to said upper chamber when water is drained from the upper into the lower chamber, and conversely for transferring gas from the upper chamber to the lower chamber when water is pumped from the lower into the upper chamber.

3. In a facility for maintaining life under sea for indefinite periods without dependence on sustaining support from the surface, the combination of a water pressure-resistant structure completely submerged in a sea, said structure having an entrance-exit including lower and upper watertight chambers in superposed relation, an inner door communicating the interior of said structure with the lower chamber, an outer door communicating the lower chamber with the sea, means for selectively draining water under static head pressure from the upper chamber into the lower chamber when said inner and outer doors are closed, valve means selectively communicating the lower chamber with the sea whereby to place water drained into the lower chamber at the ambient sea pressure and facilitate opening of the outer door, and means for selectively pumping water from the lower chamber into the upper chamber when said doors are closed whereby to facilitate opening of the inner door.

4. The facility as defined in claim 3 together with means for transferring gas from said lower chamber to said upper chamber when water is drained from the upper into the lower chamber, and conversely for transferring gas from the upper chamber to the lower chamber when water is pumped from the lower into the upper chamber.

5. In a facility for maintaining life under sea for indefinite periods without dependence on sustaining support from the surface, the combination of a water pressure-resistant structure completely submerged in a sea, and means for supplying water into said structure and for removing waste products therefrom into the sea, said means comprising a water transfer tank provided in said structure and having a valved inlet and a valved outlet communicating with the sea, a bleeder valve communicating said tank with the interior of the structure whereby water at ambient sea pressure in the tank may assume static head pressure when said valved inlet and outlet are closed and said bleeder valve is opened, valved conduit means extending from said tank to a water receptacle in said structure, pump means in said conduit means for selectively delivering water under static head pressure in the tank to said receptacle and returning waste products from the latter into the tank, means for circulating a gas content of said structure through said receptacle whereby to absorb a waste portion of the gas content in the water in the receptacle, and means for producing a water current through said tank when said valved inlet and outlet are open whereby to discharge waste carrying water into the sea.

References Cited

UNITED STATES PATENTS

| | | | |
|---|---|---|---|
| 617,750 | 1/1899 | Lake | 61—69.1 |
| 790,093 | 5/1905 | Wiedman | 277—166 X |
| 996,705 | 7/1911 | Cross | 55—95 X |
| 1,068,433 | 7/1913 | Karamanos | 61—69.1 |
| 2,705,489 | 4/1955 | Trexler | 128—1 |
| 3,074,080 | 1/1963 | Previti. | |
| 3,095,048 | 6/1963 | O'Neill et al. | |
| 3,155,459 | 11/1964 | Brown et al. | |
| 3,227,061 | 1/1966 | Swayzer. | |

ERNEST R. PURSER, *Primary Examiner.*